Figure 1:
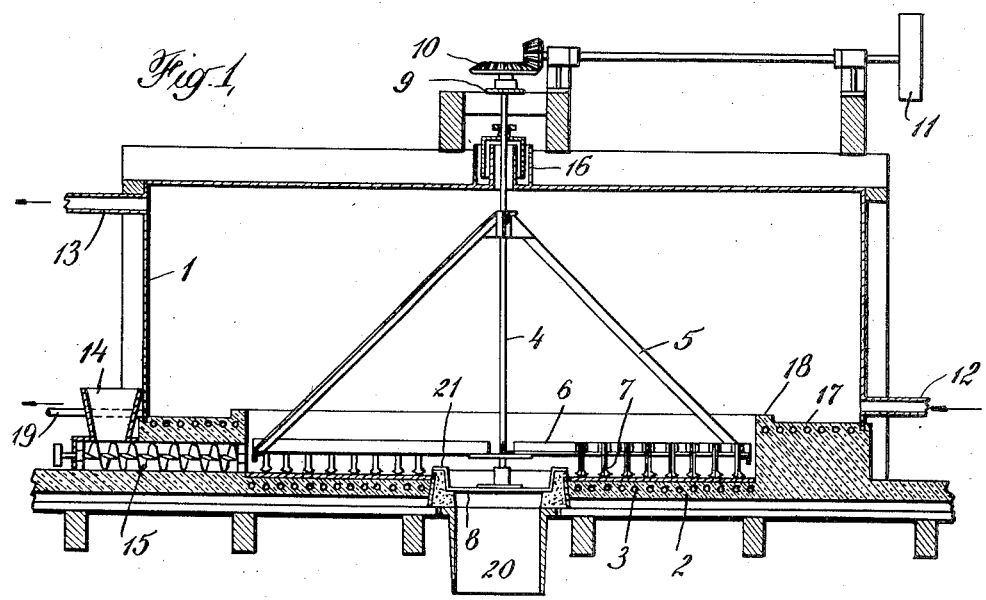

Jan. 20, 1925.

C. F. VAUGHN ET AL

MANUFACTURE OF BLEACH

Filed March 22, 1923

1,523,847

2 Sheets-Sheet 1

Inventors
Charles F. Vaughn
William B. Leach Jr.
By their Attorneys
Pennie Davis Marvin & Edmonds

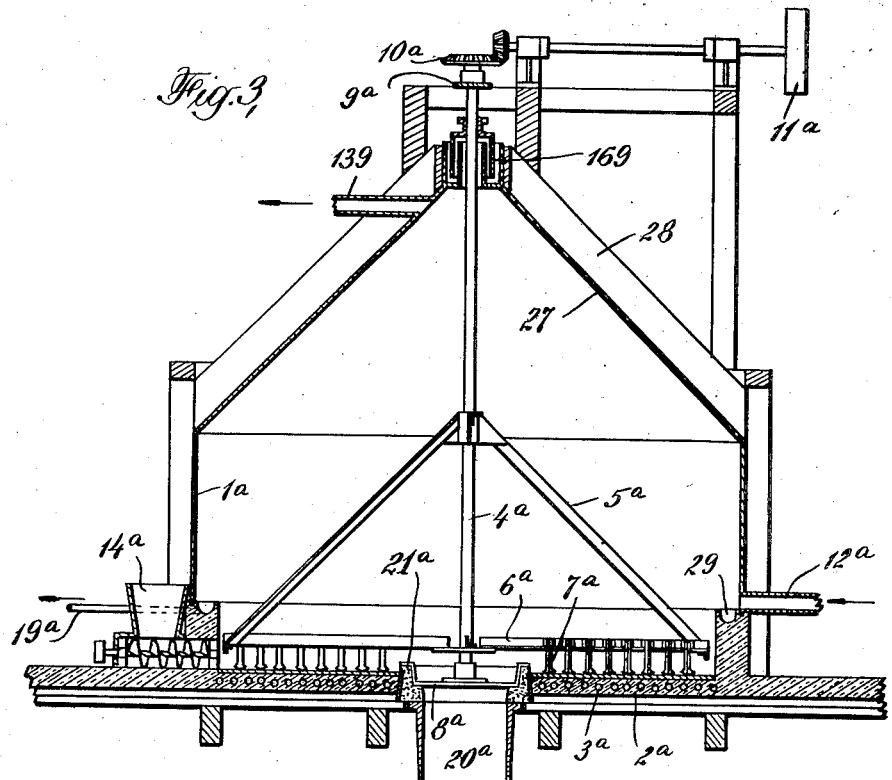

Patented Jan. 20, 1925.

1,523,847

UNITED STATES PATENT OFFICE.

CHARLES F. VAUGHN AND WILLIAM B. LEACH, JR., OF NIAGARA FALLS, NEW YORK, ASSIGNORS TO THE MATHIESON ALKALI WORKS, INC., OF NEW YORK, N. Y., A CORPORATION OF NEW YORK.

MANUFACTURE OF BLEACH.

Application filed March 22, 1923. Serial No. 626,745.

*To all whom it may concern:*

Be it known that we, CHARLES F. VAUGHN and WILLIAM B. LEACH, Jr., citizens of the United States, residing at Niagara Falls, in the county of Niagara, State of New York, have invented certain new and useful Improvements in the Manufacture of Bleach; and we do hereby declare the following to be a full, clear, and exact description of the invention, such as will enable others skilled in the art to which it appertains to make and use the same.

This invention relates to an improved method and apparatus for the manufacture of bleaching powder whereby the bleaching powder can be directly produced in the form of a dry pulverulent bleach of superior quality.

In the improved method and apparatus of the invention provision is made for subjecting hydrated lime in the form of a thick bed to the action of chlorine gas and for agitation and turning over of the lime during the chlorination. Provision is also made for refrigerating the lime itself by direct contact with a refrigerated floor or floors in the bleach chamber and for refrigerating the chlorine gas whereby the gas is dried and the temperature of the gas and of the lime undergoing chlorination is regulated as well as the humidity or moisture content of the chlorine gas and of the bed of lime and bleach. Provision is furthermore made for the circulation of the chlorine gas in such a way that the cold refrigerated gas will be caused to be circulated into contact with the bed of lime undergoing chlorination and the resulting warmer and more moist gas will be circulated and subjected to further refrigeration and drying before recirculation.

In the chlorination of lime for the manufacture of bleaching powder water is set free by the reaction, and heat of reaction is also given off. It is difficult to prevent caking and sticking to the floor even where the floor on which the lime is chlorinated is refrigerated. In the process and apparatus of the present invention, however, the chlorination can be carried out with substantial avoidance of objectionable caking and with the direct production of a pulverulent bleach. This result is accomplished by providing not only means for refrigeration of the floor on which the bed of lime is placed but the bed of lime itself is maintained of substantial thickness and is stirred or agitated during the chlorination while the chlorine gas is also refrigerated and circulated and moisture removed from it so that moisture is removed from the bed undergoing chlorination and so that its temperature as well as its moisture content is regulated, while the agitation of the lime and resulting admixture of the upper chlorinated portions with the underlying portions of the lime results in a progressive and gradual chlorination of the lime and gradual and progressive intermixture of the chlorinated lime with the unchlorinated lime until the chlorinating operation is completed. The invention will be further described in connection with the accompanying drawings illustrating two embodiments of the apparatus of the invention adapted for the practice of the process of the invention; but it is intended and will be understood that the invention is illustrated thereby but is not limited thereto.

Figure 2:
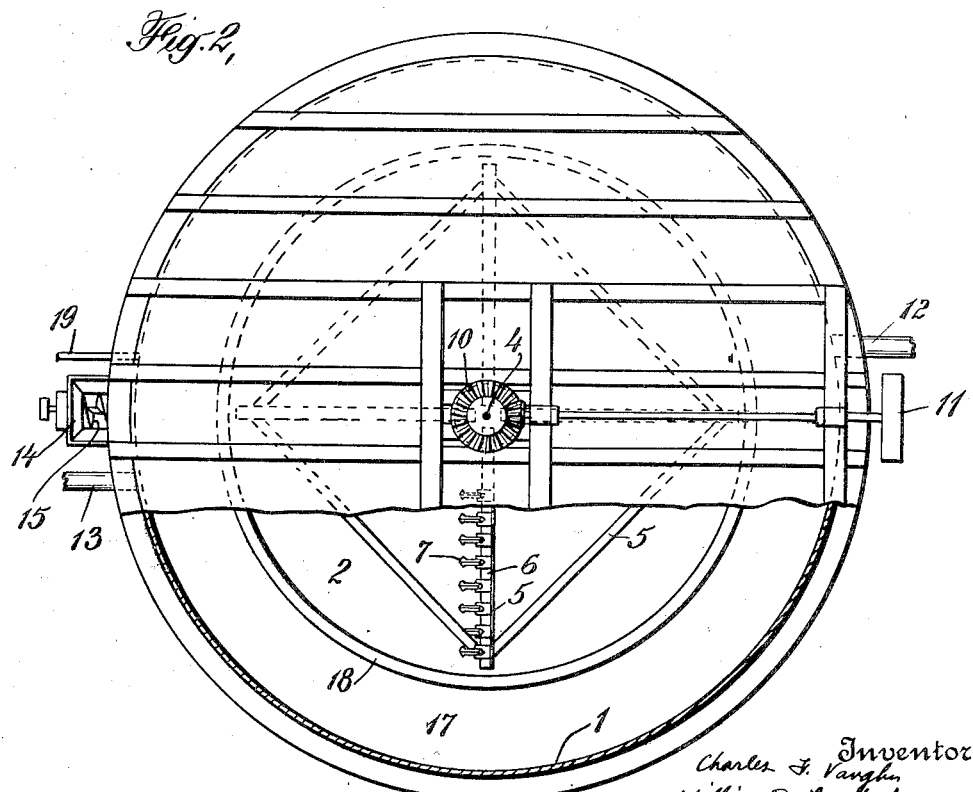

In the accompanying drawings Fig. 1 shows one form of bleach apparatus in vertical section. Fig. 2 is a plan with parts broken away and Figs. 3 and 4 are similar views of a modified structure.

In the apparatus of Figs. 1 and 2 the bleach chamber is a circular chamber 1 built of lead or other material not attacked by chlorine gas. The chamber is built upon a refrigerator floor 2, cooled by pipes 3 embedded therein and through which cold brine or other refrigerant is circulated. The chamber is provided with a central shaft 4 carrying frame work 5 to the arms 6 of which are connected plows 7 which just clear the surface of the refrigerated floor. This floor is made of tile or other suitable material. Chlorine gas is led into the chamber from a suitable source of supply through the inlet pipe 12 and exit gases are discharged through the outlet 13. Hydrated lime is fed in through the hopper 14 and screw conveyor 15. A water lute 16 allows the shaft to revolve and serves as a seal to keep the chamber gas tight.

Surrounding the main refrigerated floor section 2 is an outer annular refrigerated condensing surface 17 having pipes embedded therein for the refrigerant. An inner annular rim 18 prevents condensed moisture from flowing on to the bed of lime on the refrigerated floor 2, this condensed moisture being drawn off through one or more outlet pipes 19.

The central rotating shaft and frame work is supported by bearings 8 and 9 and driven in any suitable manner as by means of gears 10 and pulley 11.

At the center of the bleach chamber is an outlet opening 20 which serves as a discharge opening from the chamber. Around this opening is a raised ridge portion 21 which is raised a sufficient distance above the refrigerated floor 2 to maintain a bed of lime and bleach of substantial thickness before any of the bleach can overflow and be discharged through the central opening. The provision of a sufficient bed of lime and bleach is important as the agitation of such a thick bed combined with the refrigeration and progressive chlorination and with the regulation of moisture content prevents caking and sticking of the bed to the floor. We have found in practice that a bed of 4 to 6″ in thickness is sufficient to prevent trouble from caking whereas with a thinner bed of e. g. 2″ serious caking was encountered.

In the apparatus of Figs. 3 and 4 similar parts are indicated by the same reference numerals as in Figs. 1 and 2 but with the letter $a$ appended thereto.

In the apparatus of Figs. 3 and 4 the outer annular refrigerated floor 17 of Figs. 1 and 2 has been omitted and the chamber is provided with an inclined roof 27 supported by suitable supporting members 28 and adapted to be cooled by a refrigerating agent such as a brine spray or cooling jacket (not shown). The application of a refrigerating agent to the outside of the conical roof 27 will exert a refrigerating action upon the gases within the chamber similar to that exerted by the annular refrigerant floor 17 of Fig. 1. A trough 29 collects the water that condenses on the cooled surfaces and this water is permitted to flow off through the outlet pipe 19ª.

In the operation of the apparatus the hydrated lime may be supplied continuously through the hopper and screw conveyor while the chlorine gas can also be supplied continuously in regulated amount. The lime forms a bed on the refrigerated floor 2 and this bed is agitated and turned over by the plows as they revolve and are carried around over the surface of the floor, the agitation being adjusted to the conditions of temperature and gas concentration. With a continuous feed of lime a continuous discharge of bleach is obtained through the discharge opening 20 since the freshly introduced lime will be gradually worked toward the center by the plows and will be agitated and turned over and gradually worked to the center of the apparatus where it is discharged.

Since the reaction between chlorine and lime gives off heat and also sets free water the chlorine gas quickly becomes saturated with this moisture and when this occurs it is evident that no further moisture can be removed from the lime and bleach but the further water formed must remain and accumulate.

According to the present invention the chlorine gas is refrigerated and cooled and thereby freed from part of its moisture content. This occurs where the gas comes in contact with the refrigerated floor 17 of Fig. 1 or with the refrigerated roof 27 of Fig. 3. The refrigeration of the chlorine results in increasing its density and the colder gas tends to settle to the bottom of the apparatus while the warmer gas that has passed over the lime and bleach and has been warmed by the heat of reaction will tend to rise. In this way a natural circulation of the chlorine is brought about, and the refrigerating of the gas and the removal of moisture therefrom in contact with the refrigerated surfaces permits the gas to take up additional moisture when it again circulates over the bed of lime and bleach. In this way moisture is progressively removed from the bed of lime and bleach during the chlorination while such moisture as is not thus removed is distributed through the body of lime and bleach by the agitation.

In the operation of the apparatus the temperature of the floor is kept just above the freezing point so that the water will not be converted into ice and left in the bleaching powder in that form as it is discharged from the apparatus, but the somewhat higher temperature of the upper portions of the relatively thick bed of lime and bleach, due to the heat of reaction, permits and promotes the removal by evaporation of a part of the moisture content while undue rise in temperature of the upper portions of the bed is prevented both by the cooling action of the cold circulating chlorine gas and by the agitation of the bed which keeps it turned over and brings fresh portions into contact with the refrigerated floor while bringing the colder portions of the bed into intermixture with the other portions.

It will thus be seen that the present invention provides for the refrigeration or cooling of the chlorine gas and the condensation therefrom of the moisture given off in the form of vapor from the bleach making operation; and that a circulation of the gas is brought about by the heat generated by the reaction and by the cooling surfaces so that the moisture is given off from the bleach to the current of gas, then condensed from the gas as it passes over the cold surfaces, and the cold dried gas then recirculated over the bed of lime and bleach; while the water condensed from the circulating gas is drawn off through a separate outlet. The present invention in effect makes use of dry gas for the chlorination, as distinguished from a gas saturated and kept saturated with moisture, and the gas used in the present invention is kept dry by the progressive removal of moisture therefrom so that the bed of lime and bleach can likewise be kept dry by the removal therefrom in a progressive manner of a sufficient part of the water of reaction to give a dry bleach in powdered form of superior quality.

We claim:

1. The method of manufacturing bleaching powder which comprises agitating and refrigerating a thick bed of lime, circulating chlorine gas into contact therewith, removing moisture from the chlorine gas by refrigeration and recirculating the refrigerated and dried chlorine gas in contact with the bed of lime and bleaching powder.

2. The method of manufacturing bleaching powder in a continuous manner which comprises feeding lime progressively to a thick bed of lime in a bleach chamber, subjecting the lime therein to the action of chlorine gas, refrigerating and agitating the bed of lime and bleach undergoing chlorination, refrigerating the chlorine gas to remove moisture therefrom, and recirculating the refrigerated and dried gas into contact with the bed of lime and bleach undergoing chlorination, and continuously discharging the bleach from the bleach chamber.

3. The method of manufacturing bleaching powder which comprises agitating and refrigerating a thick bed of lime, circulating chlorine gas into contact therewith, removing moisture from the chlorine gas by refrigeration and recirculating the refrigerated and dried chlorine gas in contact with the bed of lime and bleaching powder, the temperature of the bed of lime and bleach being maintained above but near the freezing temperature, and the moisture content of the bleach being regulated to give a dry pulverulent bleaching powder.

4. The method of manufacturing bleaching powder in a continuous manner which comprises feeding lime progressively to a thick bed of lime in a bleach chamber, subjecting the lime therein to the action of chlorine gas, refrigerating and agitating the bed of lime and bleach undergoing chlorination, refrigerating the chlorine gas to remove moisture therefrom, and recirculating the refrigerated and dried gas into contact with the bed of lime and bleach undergoing chlorination, and continuously discharging the bleach from the bleach chamber, the temperature of the bed of lime and bleach being maintained above but near the freezing temperature, and the moisture content of the bleach being regulated to give a dry pulverulent bleaching powder.

5. A bleach chamber having means for refrigerating a bed of lime and bleach of substantial thickness therein, means for agitating such bed, means for introducing chlorine into said chamber, and means for refrigerating the chlorine gas to remove water therefrom and for recirculating the refrigerated and dried gas into contact with the bed of lime and bleach.

6. A bleach chamber having a refrigerated floor therein for maintaining a bed of lime and bleach of substantial thickness, means for agitating said bed, means for introducing chlorine into said chamber, and refrigerating means in connection with the chamber for refrigerating the chlorine gas therein and removing water therefrom.

7. A bleach chamber having a refrigerated floor therein for maintaining a bed of lime and bleach of substantial thickness, means for agitating said bed, means for introducing chlorine into said chamber, and refrigerating means in connection with the chamber for refrigerating the chlorine gas therein and removing water therefrom, said means comprising a refrigerated surface over which the chlorine gas can pass, and from which condensed water can be removed, and said refrigerated surfaces being so arranged as to promote circulation of the refrigerated and dried gas into contact with the bed undergoing chlorination.

8. A bleach chamber comprising an annular refrigerated floor adapted to maintain thereon a bed of lime and bleach of substantial thickness, means for supplying lime thereto and for removing the bleach therefrom, agitating means for agitating and turning the material of said bed, means for supplying chlorine gas to said chamber, and refrigerated surfaces annularly arranged and with which the chlorine gas in the chamber is in contact, whereby the removal of moisture from the bed undergoing chlorination is promoted by the condensation of moisture from the chlorine gas in contact with said refrigerated surfaces and by the circulation of the refrigerated and dried gas into contact with the said bed.

In testimony whereof we affix our signatures.

CHARLES F. VAUGHN.
WM. B. LEACH, Jr.